(12) United States Patent
Kang

(10) Patent No.: US 8,665,749 B2
(45) Date of Patent: Mar. 4, 2014

(54) METHOD AND APPARATUS FOR REALIZING SOURCE ROUTING IN A BLOCKING CROSS NETWORK

(75) Inventor: Zhihong Kang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 862 days.

(21) Appl. No.: 12/865,862

(22) PCT Filed: Feb. 4, 2008

(86) PCT No.: PCT/CN2008/000305
§ 371 (c)(1),
(2), (4) Date: Aug. 3, 2010

(87) PCT Pub. No.: WO2009/100575
PCT Pub. Date: Aug. 20, 2009

(65) Prior Publication Data
US 2010/0329155 A1    Dec. 30, 2010

(51) Int. Cl.
*H04L 12/28* (2006.01)

(52) U.S. Cl.
USPC .............. 370/254; 370/464; 398/68; 398/79

(58) Field of Classification Search
USPC ......... 370/254, 256, 397, 401, 404, 452, 453, 370/464; 398/57, 58, 68, 79, 135
See application file for complete search history.

(56) References Cited

U.S. PATENT DOCUMENTS

| 5,954,829 A | 9/1999 | McLain, Jr. et al. |
| 7,388,872 B2 * | 6/2008 | Montgomery, Jr. ........... 370/404 |
| 7,499,468 B2 * | 3/2009 | Montgomery, Jr. ........... 370/453 |
| 2002/0118647 A1 * | 8/2002 | Maeno ........................ 370/238.1 |
| 2004/0120318 A1 | 6/2004 | Clemm et al. |

(Continued)

FOREIGN PATENT DOCUMENTS

| CN | 1486012 A | 3/2004 |
| CN | 1533060 A | 9/2004 |

(Continued)

OTHER PUBLICATIONS

Routing Extensions to Support Network Elements with Switching Constraint Jul. 1, 2007.

(Continued)

*Primary Examiner* — Hassan Phillips
*Assistant Examiner* — Ajay Cattungal
(74) *Attorney, Agent, or Firm* — Oppedahl Patent Law Firm LLC

(57) ABSTRACT

The present invention discloses a method for realizing source routing in a blocking cross network. Link state advertisement information diffused in the network carries cross constraint characteristic information, and a call initiating node checks a path tree and gets a service path according to the cross constraint characteristic information included in the link state advertisement information in the network; the cross constraint characteristic information includes physical transmission link layer constraint information of a link in a node, which is called link switching constraint information, and constraint information of each wavelength channel in the link, which is called wavelength constraint characteristic information. The present invention also discloses an apparatus for realizing source routing in a blocking cross network. When a control connection request is initiated, the present invention can calculate a complete end-to-end path and a proposed wavelength of each link according to the link switching constraint information and the wavelength constraint characteristic information, and multi-level service scheduling is supported.

6 Claims, 4 Drawing Sheets

(56) References Cited

U.S. PATENT DOCUMENTS

| | | |
|---|---|---|
| 2004/0190900 A1 | 9/2004 | Yagyu |
| 2005/0152284 A1* | 7/2005 | Kotha et al. .................. 370/254 |
| 2005/0180431 A1* | 8/2005 | Kinoshita et al. ............. 370/397 |
| 2006/0067236 A1 | 3/2006 | Gupta et al. |
| 2007/0212067 A1* | 9/2007 | Miyazaki et al. .............. 398/57 |

FOREIGN PATENT DOCUMENTS

| | | |
|---|---|---|
| CN | 1678127 A | 5/2005 |
| CN | 1726683 A | 1/2006 |
| CN | 1878047 A | 12/2006 |
| CN | 1929690 A | 3/2007 |

OTHER PUBLICATIONS

Evaluation of Possible Interior Gateway Protocol Extensions for Wavelength Switching Optical Networks Nov. 1, 2007.

Generalized Multi-Protocol Label Switching (GMPLS) Signaling Extensions for G. 709 Optical Transport Networks Control Jan. 1, 2006.

Supplementary European Search Report in European application No. 08706483.8, mailed on Sep. 26, 2012.

International Search Report in international application No. PCT/CN2008/000305, mailed on Nov. 13, 2008.

English Translation of the Written Opinion of the International Search Authority in international application No. PCT/CN2008/000305, mailed on Nov. 13, 2008.

* cited by examiner

METHOD AND APPARATUS FOR REALIZING SOURCE ROUTING IN A BLOCKING CROSS NETWORK

TECHNICAL FIELD

The present invention relates to the field of communications, particularly to a method and apparatus for realizing source routing in a blocking cross network in an optical transmission equipment network.

BACKGROUND

In a transmission network composed of wavelength division equipments, for the wavelength service scheduling, there is certain constraint characteristic in a physical link layer and a wavelength channel layer, and there is certain constraint characteristic in multiple physical transmission links in each node in terms of service scheduling. Not all physical transmission links in each node can implement service scheduling between each other.

Wavelength service scheduling is basically up-and-down or straight-through in each node, without the capability of wavelength conversion, and this is true of a reconfigurable optical add-drop multiplexer (ROADM) system composed of a wavelength blocker (WB) and a wavelength selective switch (WSS). For a DWDM (dense wavelength division multiplexing) wavelength division equipment in which a sub-transparent multiplexing (TMUX) and the ROADM apply, due to the limitation of physical hardware conditions, the cross capability design of the TMUX is often insufficient for the crossover capability, and the wavelength channels among links in the nodes can't realize all-optical wavelength cross. When either the DWDM wavelength division equipment, or a synchronous digital hierarchy (SDH), or a synchronous optical network (SONET) or an optical transport network (OTN) is applied in a multi-level blocking cross network model for network equipment, the existing standards can't support this application sufficiently.

The switchable constraint characteristic between links only illustrates whether there is the possibility of switching between links. If service scheduling is possible on the link layer, whether service scheduling can be realized or not should also depend on the constraint characteristic of the layer of wavelength channel in the link. Service scheduling capability should be analyzed from constraint characteristics of two layers:

1. the switchable constraint capability between links in a node in a DWDM equipment network realized by multidimensional ROADM technology, generally, if it's possible to implement service scheduling on the link layer between links of two directions in a node, the links of two directions are connected to each other by optical fibers inside. If the links of two directions are not connected to each other by optical fibers, there is no service scheduling capability between the two links. Every set of links of two directions in a system comprise a group and the service scheduling capability of each group is represented by bit. 1 means the two links in a group have the service scheduling capability between them on the physical link layer, while 0 means the two links in a group don't have the service scheduling capability between them on the physical link layer. Take an 8-dimensional ROADM as an example. Every set of links of two directions in the system comprise a group and there are a total of 7×8/2=28 groups in the system. The fixed combinations show that it's possible that transport links of two specific directions have the service scheduling capability between them on the link layer. The following Table 1 shows such combinations.

TABLE 1

Corresponding relationship between link groups and bits in a node

|   | A | B | C | D | E | F | G | H |
|---|---|---|---|---|---|---|---|---|
| A |   | 1 | 2 | 3 | 4 | 5 | 6 | 7 |
| B |   |   | 8 | 9 | 10 | 11 | 12 | 13 |
| C |   |   |   | 14 | 15 | 16 | 17 | 18 |
| D |   |   |   |   | 19 | 20 | 21 | 22 |
| E |   |   |   |   |   | 23 | 24 | 25 |
| F |   |   |   |   |   |   | 26 | 27 |
| G |   |   |   |   |   |   |   | 28 |
| H |   |   |   |   |   |   |   |   |

2. the scheduling capability between wavelengths in each link in a node in the blocking cross network model as shown in FIG. 1, wherein a switching unit DXC (digital cross connect equipment) implements electrical cross or optical cross. A west terminal equipment (TE) link distributes wavelengths in the link into different switching units through a DWDM wavelength division equipment, which is also true of the east TE link. Wavelength switching can be achieved only when the wavelength in the west TE link and that in the east TE link are in one switching unit. In the DWDM equipment realized by the conventional ROADM technology, wavelengths are basically up-and-down or straight-through in each node and wavelength switching is impossible. Such a collection which limits wavelength switching in the link is defined as a wavelength switching group (or wavelength group). The wavelength collection in each link which is in one wavelength switching group (or wavelength group) can realize wavelength conversion, while wavelengths in each link which are not in one wavelength group can't realize wavelength conversion. For link wavelengths only with the capability of up-and-down or straight-through, the same wavelength is a wavelength switching group (or wavelength group).

However, in the existing technology, in a blocking cross network, only the available link bandwidth information is considered as the general condition for routing calculation. In such way, in the process of call connection establishment control, selection of service path and wavelength will be tried again and again, which brings the complicated signaling control process, making the time which is used in service establishment and recovery uncertain.

SUMMARY

The technical problem to be solved by the present invention is to provide a method and apparatus for realizing source routing in a blocking cross network, to overcome the problem in the existing technology that only the available link bandwidth information is considered as a routing calculation condition, which leads to selection of service path and wavelength being tried again and again in the process of call connection establishment, thereby making the control too complicated.

To solve the aforementioned problem, the present invention provides a method for realizing source routing in a blocking cross network, which includes: link state advertisement information diffused in a network carries cross constraint characteristic information, and a call initiating node checks a path tree to get a service path according to the cross constraint characteristic information included in the link state advertisement information in the network; wherein the cross constraint characteristic information includes physical transmission link layer constraint information of a link in a node, which is called link switching constraint information, and constraint information of each wavelength channel in the link, which is called wavelength constraint characteristic information.

Further, the method may include the following steps:

(A) in a blocking cross network, the link switching constraint information of each link in a node and all the wavelength constraint characteristic information of each link are written into each link state advertisement information;

(B) the link state advertisement information is diffused in the network;

(C) when a node initiates a call connection establishment request, a path tree is calculated according to available link bandwidth information; and (D) the node checks the path tree by using the link switching constraint information and the wavelength constraint characteristic information which are included in the link state advertisement information, and selects a qualified service path from the path tree.

Further, the link switching constraint information may be represented by a work direction and link constraint characteristic information corresponding to the work direction; and the link constraint characteristic information may be represented by whether there is service scheduling capability between the link and a link of a corresponding work direction in a system;

the wavelength constraint characteristic information may include resource state information and cross constraint information of each wavelength channel, and specifically may include a type of a signal carried over each wavelength channel, an identity of a wavelength switching group to which a wavelength belongs, resource state, and a type of signal cascade multiplexing.

Further, the process of that the call initialing node checks the path tree to get the service path according to the cross constraint characteristic information in the network may include:

the node checks each path and each node in each path tree according to the cross constraint characteristic information of the link to determine whether each link and each wavelength of each path in the path tree possess wavelength switching capability of end-to-end service establishment, and selects a qualified service path from the path tree to acquire source routing information.

To solve the aforementioned problem, the present invention also provides a method for realizing source routing in a blocking cross network, which includes: link state advertisement information diffused in a network carries constraint information of each wavelength channel in a link; physical transmission link layer constraint information of each link in a node is diffused in the network, wherein the physical transmission link layer constraint information of the link in a node is called link switching constraint information; the constraint information of each wavelength channel in the link is called wavelength constraint characteristic information, and the link switching constraint information and the wavelength constraint characteristic information are collectively called cross constraint characteristic information.

Further, the method may include the following steps:

(a) in a blocking cross network, all the wavelength constraint characteristic information of each link in a node is written into the link state advertisement information;

(b) the link state advertisement information is diffused in the network; and the link switching constraint information is diffused in the network as summary information;

(c) when a node initiates a call connection establishment request, a path tree is calculated according to available link bandwidth information; and (d) the node checks the path tree by using the link switching constraint information and the wavelength constraint characteristic information to get a qualified service path.

Further, the summary information may be represented by link constraint characteristic information corresponding to each work direction; and the link constraint characteristic information may be represented by whether there is service scheduling capability between the link and a link of a corresponding work direction in a system;

the wavelength constraint characteristic information may include resource state information and cross constraint information of each wavelength channel, and specifically may include a type of signal carried over each wavelength channel, an identity of a wavelength switching group to which a wavelength belongs, resource state, and a type of signal cascade multiplexing.

Further, the process of that the call initiating node checks the path tree to get the service path according to the cross constraint characteristic information in the network may include:

the node checks each path and each node in each path tree according to the cross constraint characteristic information of the link to determine whether each link and each wavelength of each path in the path tree possess wavelength switching capability of end-to-end service establishment, and selects a qualified service path from the path tree to acquire source routing information.

In order to solve the aforementioned problem, the present invention also provides an apparatus for realizing source routing in a blocking cross network, which includes a link state advertisement information encapsulating unit, a diffused information sending unit, a path tree calculating unit, a diffused information receiving unit, and a path tree checking unit;

wherein the link state advertisement information encapsulating unit is used for writing cross constraint characteristic information of a node into link state advertisement information and sending encapsulated link state advertisement information to the diffused information sending unit; the diffused information sending unit is used for diffusing the link state advertisement information into a network; the path tree calculating unit is used for calculating a path tree according to available link bandwidth information and sending information of the path tree to the path tree checking unit; the diffused information receiving unit is used for receiving the link state advertisement information in the network and sending to the path tree checking unit the cross constraint characteristic information included in the link state advertisement information; and the path tree checking unit is used for checking the path tree according to the cross constraint characteristic information and selecting a qualified service path from the path tree;

wherein the cross constraint characteristic information includes physical transmission link layer constraint information of a link in a node, which is called link switching constraint information, and constraint information of each wavelength channel in the link, which is called wavelength constraint characteristic information.

In order to solve the aforementioned problem, the present invention also provides an apparatus for realizing source routing in a blocking cross network, which includes a link state advertisement information encapsulating unit, a summary information encapsulating unit, a diffused information sending unit, a path tree calculating unit, a diffused information receiving unit, and a path tree checking unit;

wherein the link state advertisement information encapsulating unit is used for writing all wavelength constraint characteristic information of each link in a node into link state advertisement information and sending encapsulated link state advertisement information to the diffused information sending unit; the summary information encapsulating unit is used for encapsulating physical transmission link layer constraint information of each link in the node as summary information and sending the summary information to the diffused information sending unit; the diffused information sending unit is used for diffusing the link state advertisement information and the summary information into a network; the path tree calculating unit is used for calculating a path tree according to available link bandwidth information and sending information of the path tree to the path tree checking unit; the diffused information receiving unit is used for receiving the link state advertisement information and the summary information in the network and sending to the path tree checking unit the wavelength constraint characteristic information included in the link state advertisement information and the physical transmission link layer constraint information included in the summary information, wherein the wavelength constraint characteristic information and the physical transmission link layer constraint information are collectively called cross constraint characteristic information; and the path tree checking unit is used for checking the path tree according to the cross constraint characteristic information and selecting a qualified service path from the path tree;

wherein the physical transmission link layer constraint information of the link in a node is called link switching constraint information; and constraint information of each wavelength channel in the link is called wavelength constraint characteristic information.

In the present invention, the cross constraint characteristic information of a link in a node is carried in link state advertisement information, wherein the cross constraint characteristic information includes two layers, i.e. a physical transmission link layer and a wavelength channel layer; or the constraint characteristic of the physical transmission link layer in a node is diffused in the network as summary information; in the calculation process of service paths, one or more qualified service paths are calculated by checking each path and each node in each path tree according to the constraint characteristic information of a link. In such way, when a control connection request is initiated, a complete end-to-end path and a proposed wavelength of each link can be calculated according to the link state advertisement information in the first node, and the multi-level service scheduling is supported.

DETAILED DESCRIPTION

The core idea of the present invention is to make a call initiating node be able to check a path tree according to cross constraint characteristic information in a network to get a qualified service path by the cross constraint characteristic information of a link (mainly including physical transmission link layer constraint information of the link in a node and constraint information of each wavelength channel in the link) which is carried in link state advertisement information diffused in the network.

Wherein the cross constraint characteristic information mainly includes information of two layers, i.e. information of a physical transmission link layer and information of a wavelength channel layer; wherein the constraint characteristic information of the physical transmission link layer is link switching constraint information; and the constraint characteristic information of the wavelength channel layer is wavelength constraint characteristic information, including resource state information and cross constraint information of each wavelength channel;

the link switching constraint information and the wavelength constraint characteristic information may be carried in the link state advertisement information diffused in a network; or the link switching constraint information may be diffused in a control domain as summary information, while the link state advertisement information carries the wavelength constraint characteristic information.

In the following, the preferred embodiments of the present invention are described in detail in combination with the drawings.

Figure 1:
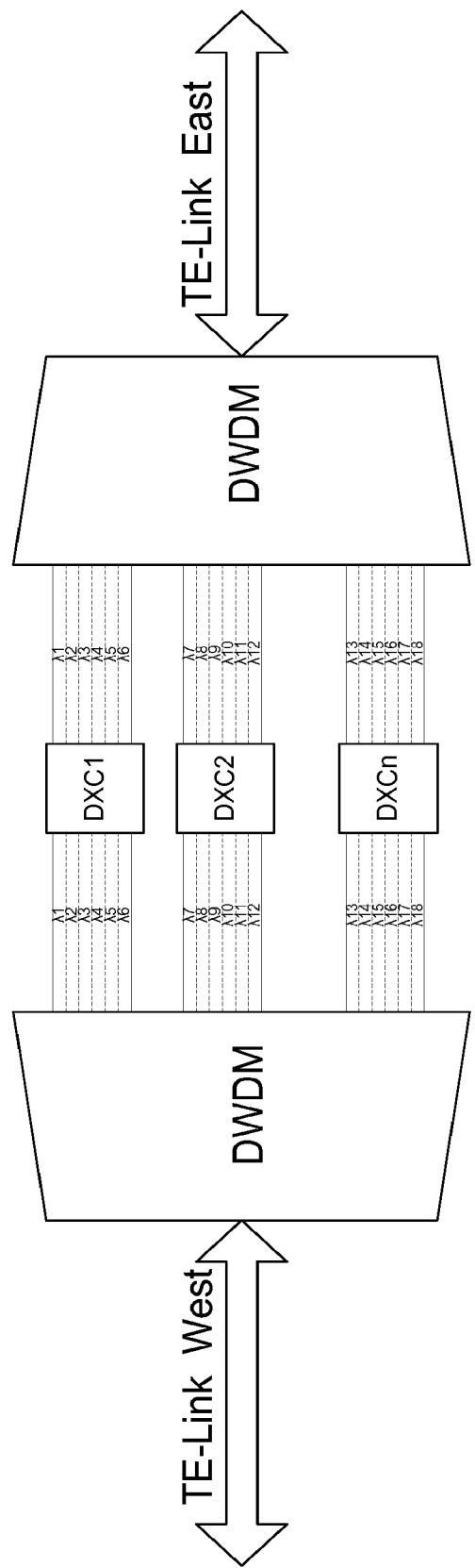
FIG. 1 shows a blocking cross network model.
Figure 2:
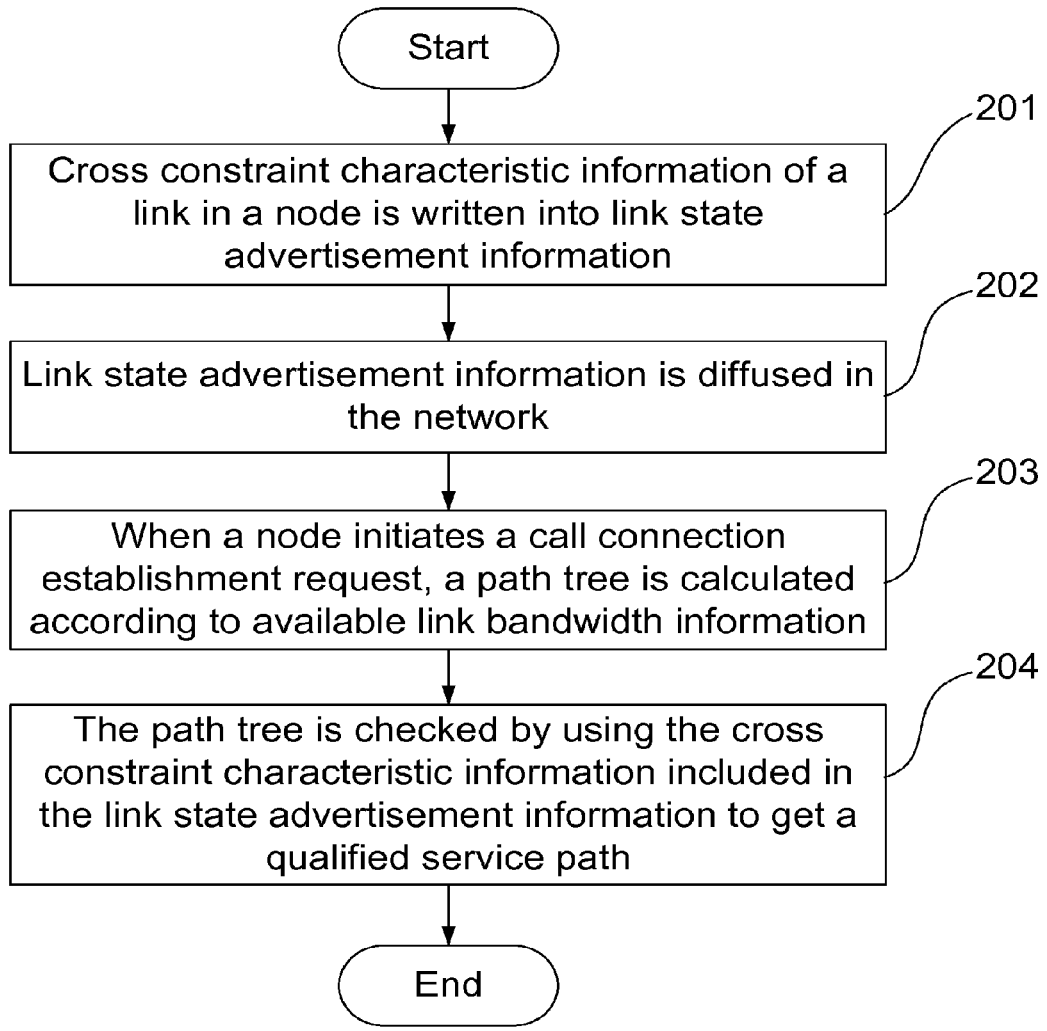
FIG. 2 is a flow chart of an embodiment of the present invention.

As shown in FIG. 2, an embodiment of the present invention includes the following steps:

step 201: in a blocking cross network, each node writes cross constraint characteristic information of a link in a node into link state advertisement information;

wherein the written cross constraint characteristic information may be link switching constraint information and wavelength constraint characteristic information, or the wavelength constraint characteristic information;

the link switching constraint information may be represented by a work direction and link constraint characteristic information corresponding to the work direction; or represented by summary information of the link constraint characteristic information between transmission links in a node, i.e. the link constraint characteristic information of each work direction. The link switching constraint information is not written into the link state advertisement information if it is regarded as the summary information;

the link constraint characteristic information is represented by whether there is service scheduling capability between the link and a link of a corresponding work direction in a system;

the wavelength constraint characteristic information includes a type of a signal carried over each wavelength channel, an identity of a wavelength switching group to which a wavelength belongs, resource state, and a type of signal cascade multiplexing;

step 202: the link state advertisement information is diffused in the network;

If the link switching constraint information is used as summary information, it will be diffused in the network separately or flooded in a control domain;

step 203: when a node initiates a call connection establishment request, a path tree is calculated according to available link bandwidth information;

the path tree may be calculated by using the conventional routing calculation algorithm, i.e. shortest path first (SPF) algorithm; and step 204: the path tree is checked by using the cross constraint characteristic information included in the link state advertisement information to get a qualified service path;

in the process of path tree calculation, each path and each node in each path tree are checked according to the cross constraint characteristic information of the link to determine whether each link and each wavelength of each path in the path tree possess wavelength switching capability of end-to-end service establishment, and one or more qualified paths can be calculated to acquire source routing information, and the source routing information may provide available wavelength of each link in the qualified path to provide reliable routing assurance for call connection control.

Figure 3:
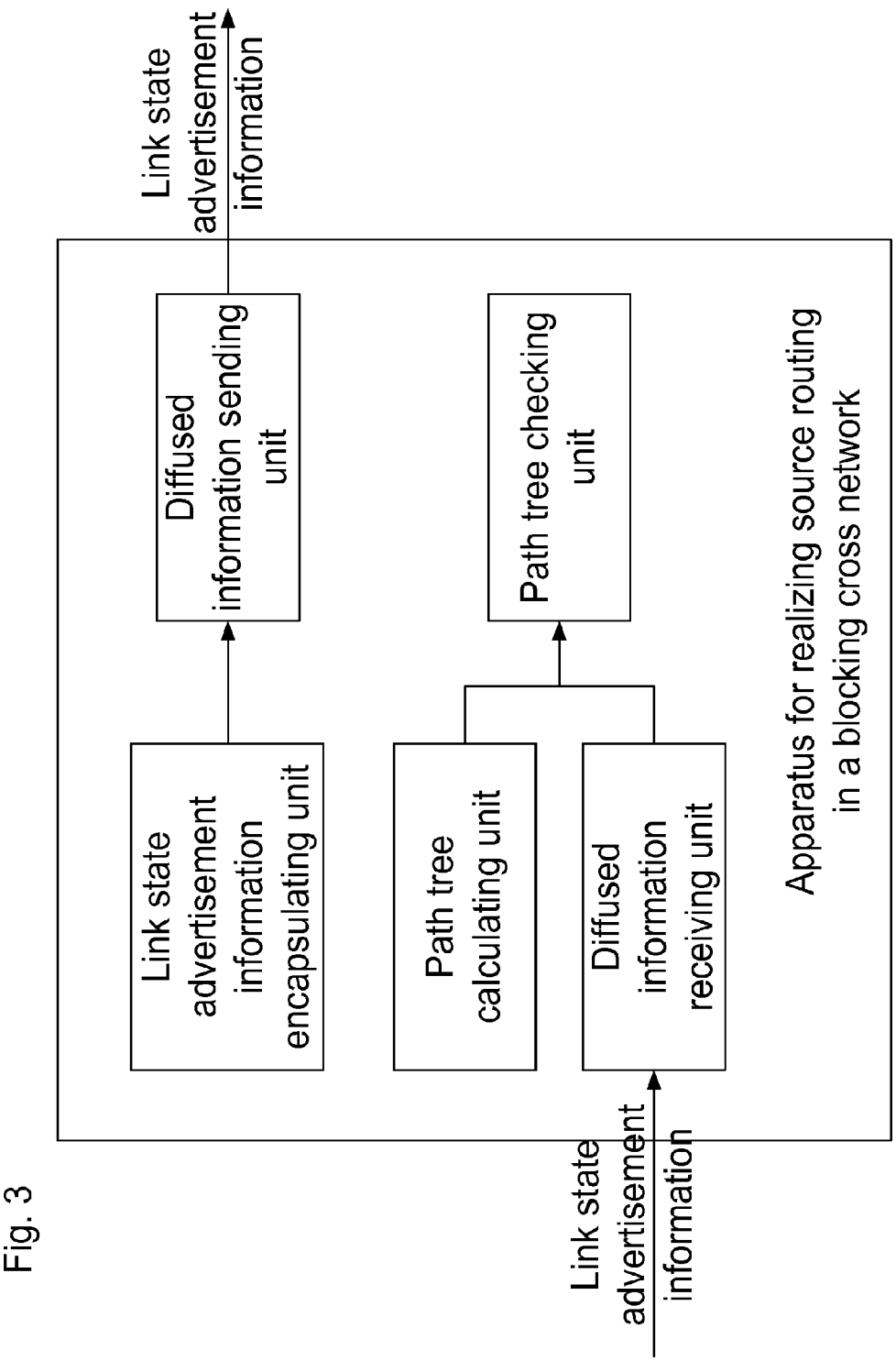
FIG. 3 is a schematic diagram of an apparatus for an embodiment of the present invention.

The network of the present invention includes many nodes, and each node has an apparatus for realizing source routing in a blocking cross network according to the embodiments of the present invention. As shown in FIG. 3, the apparatus in one of nodes as above includes: a link state advertisement information encapsulating unit, a diffused information sending unit, a path tree calculating unit, a diffused information receiving unit, and a path tree checking unit;

wherein the link state advertisement information encapsulating unit is used for writing cross constraint characteristic information of the node into link state advertisement information and sending encapsulated link state advertisement information to the diffused information sending unit. In practical applications, this link state advertisement information encapsulating unit is generally realized by a local resource management (LRM) module;

the diffused information sending unit is used for diffusing the link state advertisement information into a network. In practical applications, this diffused information sending unit is generally realized by an open shortest path first—traffic engineering (OSPF-TE) module;

the path tree calculating unit is used for calculating a path tree according to available link bandwidth information and sending information of the path tree to the path tree checking unit;

the diffused information receiving unit is used for receiving the link state advertisement information in the network and sending to the path tree checking unit the cross constraint characteristic information included in the link state advertisement information;

the path tree checking unit is used for checking the path tree according to the cross constraint characteristic information and selecting a qualified service path from the path tree.

Figure 4:
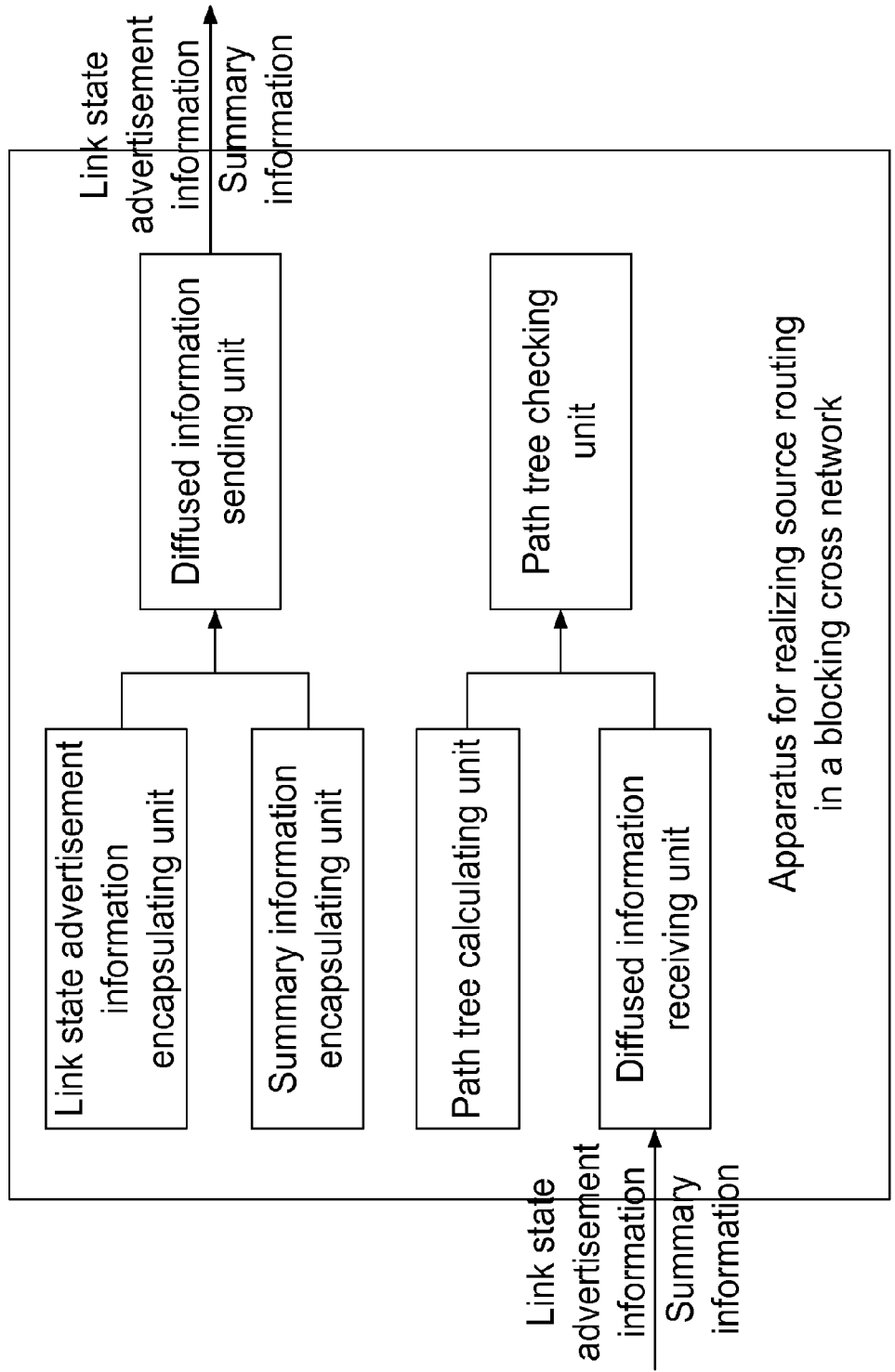
FIG. 4 is a schematic diagram of an apparatus for another embodiment of the present invention.

FIG. 4 is a schematic diagram of an apparatus for realizing source routing in a blocking cross network according to another embodiment of the present invention.

The apparatus includes a link state advertisement information encapsulating unit, a summary information encapsulating unit, a diffused information sending unit, a path tree calculating unit, a diffused information receiving unit, and a path tree checking unit;

wherein the link state advertisement information encapsulating unit is used for writing all wavelength constraint characteristic information of each link in the node into link state advertisement information and sending encapsulated link state advertisement information to the diffused information sending unit;

the summary information encapsulating unit is used for encapsulating physical transmission link layer constraint information of each link in the node as summary information and sending the summary information to the diffused information sending unit;

the diffused information sending unit is used for diffusing the link state advertisement information and the summary information into a network;

the path tree calculating unit is used for calculating a path tree according to available link bandwidth information and sending information of the path tree to the path tree checking unit;

the diffused information receiving unit is used for receiving the link state advertisement information and the summary information in the network, and sending to the path tree checking unit the cross constraint characteristic information, which is included in the link state advertisement information and the summary information; and the path tree checking unit is used for checking the path tree according to the cross constraint characteristic information and selecting a qualified service path from the path tree.

In the following, further descriptions are presented by using the specific application examples.

Take transmission links working with 8 work directions in a system as an example. Link switching constraint information of each transmission link in a node may be represented as follows:

The front bits represent the service scheduling capability between this link and links of other directions in the system. 0 represents that there is no service scheduling capability between this link and a corresponding link; and 1 represents that first there is service scheduling capability on the physical link layer between this link and a corresponding link. A constant bit represents the constraint relation between the working link of this direction and the working link of a fixed direction.

The wavelength constraint characteristic information in the link, namely the resource state information and cross constraint information of each wavelength channel may be represented as follows:

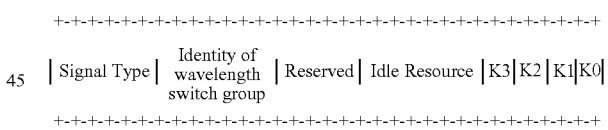

Each field is defined as follows:
Signal Type mainly includes:
OCh (optical channel): 2.5 Gbps (ODU1)
OCh: 10 Gbps (ODU2)
OCh: 40 Gbps (ODU3)
Identity of wavelength switching group: the identity of a wavelength switching group to which a wavelength belongs in the node. Wavelengths in the same wavelength switching group in each link of a node can implement wavelength switching with each other. It is an identity of wavelength switching capability in a node;
Reserved: regarded as a reserved field;
Idle Resource: represents the number of idle basic units in the multiplexing structure of physical signals carried over a wavelength channel;
K3: 1 means a wavelength channel signal is made by multiplexing 40G signals (i.e. ODU3);
if the Signal Type is 40G signal, it means the wavelength channel is a separate wavelength channel which can not be subdivided and the values of idle resource may only be 0 and 1, wherein 0 means the wavelength channel is occupied, while 1 means the wavelength channel is idle;

K2: 1 means a wavelength channel signal is made by multiplexing 10G signals (i.e. ODU2);

if the Signal Type is 40G signal, it means the wavelength channel is made by multiplexing 4 sub-wavelength channels of 10G signal; the values of idle resource are 0 to 4, wherein 0 means all the wavelength channel resource is occupied, while 1 to 4 respectively mean the number of idle sub-wavelength channels;

if the Signal Type is 10G signal, it means the wavelength channel is a separate wavelength channel which can not be subdivided and the values of idle resource may only be 0 and 1, wherein 0 means the wavelength channel is occupied, while 1 means the wavelength channel is idle;

K1: means a wavelength channel signal is made by multiplexing 2.5G signals (i.e. ODU1);

if the Signal Type is 40G signal, it means the wavelength channel is made by multiplexing 16 sub-wavelength channels of 2.5G signal; the values of idle resource are 0 to 16, wherein 0 means all the wavelength channel resource is occupied, while 1 to 16 respectively mean the number of idle sub-wavelength channels;

if the Signal Type is 10G signal, it means the wavelength channel is made by multiplexing 4 sub-wavelength channels of 2.5G signal; the values of idle resource are 0 and 4, wherein 0 means all the wavelength channel resource is occupied, while 1 and 4 means the number of idle sub-wavelength channels;

if the signal type is 2.5G signal, it means the wavelength channel is a separate wavelength channel which can not be subdivided and the values of idle resource may only be 0 and 1, wherein 0 means the wavelength channel is occupied, while 1 means the wavelength channel is idle;

K0: means a wavelength channel signal is made by multiplexing GE (gigabit ethernet signals (i.e. ODU0);

if the Signal Type is 40G signal, it means the wavelength channel is made by multiplexing 32 sub-wavelength channels of GE signal; the values of idle resource are 0 to 32, wherein 0 means all the wavelength channel resource is occupied; 1 to 32 respectively mean the number of idle sub-wavelength channels;

if the Signal Type is 10G signal, it means the wavelength channel is made by multiplexing 8 sub-wavelength channels of GE signal; the values of idle resource are 0 to 8, wherein 0 means all the wavelength channel resource is occupied; and 1 to 8 respectively mean the number of idle sub-wavelength channels;

if the Signal Type is 2.5G signal, it means the wavelength channel is made by multiplexing 2 sub-wavelength channels of GE signal; the values of idle resource may only be 0 to 2, wherein 0 means all the wavelength channel resource is occupied, while 1 to 2 respectively mean the number of idle sub-wavelength channels;

only one of K3, K2, K1 and K0 has bit being 1;

the above transmission of the link resource information including the link switching constraint information is managed by a local resource management (LRM) module in a control plane.

The link switching constraint information may be carried and transmitted in the following ways.

the first way

With an automatic switched optical network (ASON) and a generalized multi protocol label switching (GMPLS) routing system as a framework, the link switching constraint information is carried and transmitted in the diffused link state advertisement information based on an OSPF-TE in a whole network; in LINK Type-Length-Value (LINK TLV), interface switching capability descriptor Sub-TLV is extended and defined to carry various cross constraint characteristic information of the transmission link in a node. The original defined format is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Switching Cap |   Encoding    |           Reserved            |
+-+-+-+-+-+-+-+-+-+-+-+-+-+-+-+-+-+-+-+-+-+-+-+-+-+-+-+-+-+-+-+-+
|                  Max LSP Bandwidth at priority 0              |
+-+-+-+-+-+-+-+-+-+-+-+-+-+-+-+-+-+-+-+-+-+-+-+-+-+-+-+-+-+-+-+-+
|                  Max LSP Bandwidth at priority 1              |
+-+-+-+-+-+-+-+-+-+-+-+-+-+-+-+-+-+-+-+-+-+-+-+-+-+-+-+-+-+-+-+-+
|                  Max LSP Bandwidth at priority 2              |
+-+-+-+-+-+-+-+-+-+-+-+-+-+-+-+-+-+-+-+-+-+-+-+-+-+-+-+-+-+-+-+-+
|                  Max LSP Bandwidth at priority 3              |
+-+-+-+-+-+-+-+-+-+-+-+-+-+-+-+-+-+-+-+-+-+-+-+-+-+-+-+-+-+-+-+-+
|                  Max LSP Bandwidth at priority 4              |
+-+-+-+-+-+-+-+-+-+-+-+-+-+-+-+-+-+-+-+-+-+-+-+-+-+-+-+-+-+-+-+-+
|                  Max LSP Bandwidth at priority 5              |
+-+-+-+-+-+-+-+-+-+-+-+-+-+-+-+-+-+-+-+-+-+-+-+-+-+-+-+-+-+-+-+-+
|                  Max LSP Bandwidth at priority 6              |
+-+-+-+-+-+-+-+-+-+-+-+-+-+-+-+-+-+-+-+-+-+-+-+-+-+-+-+-+-+-+-+-+
|                  Max LSP Bandwidth at priority 7              |
+-+-+-+-+-+-+-+-+-+-+-+-+-+-+-+-+-+-+-+-+-+-+-+-+-+-+-+-+-+-+-+-+
|              Switching Capability-specific information        |
|                           (variable)                          |
+-+-+-+-+-+-+-+-+-+-+-+-+-+-+-+-+-+-+-+-+-+-+-+-+-+-+-+-+-+-+-+-+
```

The new defined format is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            TYPE               |        LENGTH = 44+n*4        |
+-+-+-+-+-+-+-+-+-+-+-+-+-+-+-+-+-+-+-+-+-+-+-+-+-+-+-+-+-+-+-+-+
| Switching Cap |   Encoding    |           Reserved            |
+-+-+-+-+-+-+-+-+-+-+-+-+-+-+-+-+-+-+-+-+-+-+-+-+-+-+-+-+-+-+-+-+
|                  Max LSP Bandwidth at priority 0              |
+-+-+-+-+-+-+-+-+-+-+-+-+-+-+-+-+-+-+-+-+-+-+-+-+-+-+-+-+-+-+-+-+
```

```
                    -continued
|           Max LSP Bandwidth at priority 1              |
+-+-+-+-+-+-+-+-+-+-+-+-+-+-+-+-+-+-+-+-+-+-+-+-+-+-+-+-+-+-+-+-+
|           Max LSP Bandwidth at priority 2              |
+-+-+-+-+-+-+-+-+-+-+-+-+-+-+-+-+-+-+-+-+-+-+-+-+-+-+-+-+-+-+-+-+
|           Max LSP Bandwidth at priority 3              |
+-+-+-+-+-+-+-+-+-+-+-+-+-+-+-+-+-+-+-+-+-+-+-+-+-+-+-+-+-+-+-+-+
|           Max LSP Bandwidth at priority 4              |
+-+-+-+-+-+-+-+-+-+-+-+-+-+-+-+-+-+-+-+-+-+-+-+-+-+-+-+-+-+-+-+-+
|           Max LSP Bandwidth at priority 5              |
+-+-+-+-+-+-+-+-+-+-+-+-+-+-+-+-+-+-+-+-+-+-+-+-+-+-+-+-+-+-+-+-+
|           Max LSP Bandwidth at priority 6              |
+-+-+-+-+-+-+-+-+-+-+-+-+-+-+-+-+-+-+-+-+-+-+-+-+-+-+-+-+-+-+-+-+
|           Max LSP Bandwidth at priority 7              |
+-+-+-+-+-+-+-+-+-+-+-+-+-+-+-+-+-+-+-+-+-+-+-+-+-+-+-+-+-+-+-+-+
|                  Work direction of link                |
+-+-+-+-+-+-+-+-+-+-+-+-+-+-+-+-+-+-+-+-+-+-+-+-+-+-+-+-+-+-+-+-+
|            Link constraint characteristic information |
+-+-+-+-+-+-+-+-+-+-+-+-+-+-+-+-+-+-+-+-+-+-+-+-+-+-+-+-+-+-+-+-+
              Identity of
| Signal Type | wavelength  | Reserved | Idle resource |K3|K2|K1|K0|
              switch group +-+-+-+-+-+-+-+-+-+-+-+-+-+-+-+-+-+-+-+-+-+-+-+-+-+-+-+-+-+-+-+-+
              Identity of
| Signal Type | wavelength  | Reserved | Idle resource |K3|K2|K1|K0|
              switch group +-+-+-+-+-+-+-+-+-+-+-+-+-+-+-+-+-+-+-+-+-+-+-+-+-+-+-+-+-+-+-+-+
|                                                        |
//                    .........                         //
|                                                        |
+-+-+-+-+-+-+-+-+-+-+-+-+-+-+-+-+-+-+-+-+-+-+-+-+-+-+-+-+-+-+-+-+
              Identity of
| Signal Type | wavelength  | Reserved | Idle resource |K3|K2|K1|K0|
              switch group

+-+-+-+-+-+-+-+-+-+-+-+-+-+-+-+-+-+-+-+-+-+-+-+-+-+-+-+-+-+-+-+-+
```

If the type of switching cap is LSC, the link work direction of the transmission link is extended and defined in switching capability-specific information (variable), the link constraint characteristic information of the link in the node, the types of signals carried over each wavelength channel, the identity of the wavelength switching group to which the wavelength belongs, the resource state, and the type of signal cascade multiplexing, and information of each wavelength channel are arranged in sequence; in the LENGTH field, n is the number of wavelength channels in the transmission link.

The Second Way

With an ASON and a GMPLS routing system as a framework, based on an OSPF-TE in a whole network, in the LINK TLV which is carried in the diffused link state advertisement information two new Sub-TLVs are defined to carry the link switching constraint information of the transmission link, and the resource state information of wavelength channel and cross constraint information of wavelength channel in the link respectively.

The new Sub-TLV format defined by the link switching constraint information is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          TYPE                |           LENGTH               |
+-+-+-+-+-+-+-+-+-+-+-+-+-+-+-+-+-+-+-+-+-+-+-+-+-+-+-+-+-+-+-+-+
|                  Work direction of link                        |
+-+-+-+-+-+-+-+-+-+-+-+-+-+-+-+-+-+-+-+-+-+-+-+-+-+-+-+-+-+-+-+-+
|            Link constraint characteristic information         |
+-+-+-+-+-+-+-+-+-+-+-+-+-+-+-+-+-+-+-+-+-+-+-+-+-+-+-+-+-+-+-+-+
```

The Sub-TLV defined by the resource state information of the wavelength channel and cross constraint information of the wavelength channel is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          TYPE                |        LENGTH = n*4             |
+-+-+-+-+-+-+-+-+-+-+-+-+-+-+-+-+-+-+-+-+-+-+-+-+-+-+-+-+-+-+-+-+
              Identity of
| Signal Type | wavelength  | Reserved | Idle resource |K3|K2|K1|K0|
              switch group +-+-+-+-+-+-+-+-+-+-+-+-+-+-+-+-+-+-+-+-+-+-+-+-+-+-+-+-+-+-+-+-+
              Identity of
| Signal Type | wavelength  | Reserved | Idle resource |K3|K2|K1|K0|
              switch group +-+-+-+-+-+-+-+-+-+-+-+-+-+-+-+-+-+-+-+-+-+-+-+-+-+-+-+-+-+-+-+-+
|                                                                |
//                    .........                                 //
|                                                                |
+-+-+-+-+-+-+-+-+-+-+-+-+-+-+-+-+-+-+-+-+-+-+-+-+-+-+-+-+-+-+-+-+
              Identity of
| Signal Type | wavelength  | Reserved | Idle resource |K3|K2|K1|K0|
              switch group

+-+-+-+-+-+-+-+-+-+-+-+-+-+-+-+-+-+-+-+-+-+-+-+-+-+-+-+-+-+-+-+-+
```

The Third Way

The link switching constraint information between transmission links in a node is represented as summary information, and the summary information between transmission links of 8 work directions is represented as follows:

```
  AB  AC  AD  AE  AF  AG  AH  BC  BD  BE  BF  BG  BH  CD  CE  CF  CG  CH  DE  DF  DG  DH  EF  EG  EH  FG  FH  GH
 +-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+
 | | | | | | | | | | | | | | | | | | | | | | | | | | | | | | | | | | | | | | | | | | | | | | | | | | | | | | |
 +-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+-+
```

A constant bit corresponds to the constraint capability between links of two fixed directions; 1 means scheduling can be implemented between the links of two directions on the physical link layer, while 0 means scheduling can not be implemented between the links of two directions on the physical link layer, the information can be diffused in each control domain of an intelligent control network.

The wavelength constraint characteristic information of each transmission link is carried in the transmission link state advertisement (LSA) information in a manner based on the first way and the second way; the work direction of a link, and the resource state information and cross constraint information of each wavelength channel are extended and defined in the interface switching capability descriptor sub-TLV:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            TYPE               |       LENGTH = 40+n*4         |
+-+-+-+-+-+-+-+-+-+-+-+-+-+-+-+-+-+-+-+-+-+-+-+-+-+-+-+-+-+-+-+-+
| Switching Cap |   Encoding    |           Reserved            |
+-+-+-+-+-+-+-+-+-+-+-+-+-+-+-+-+-+-+-+-+-+-+-+-+-+-+-+-+-+-+-+-+
|                   Max LSP Bandwidth at priority 0             |
+-+-+-+-+-+-+-+-+-+-+-+-+-+-+-+-+-+-+-+-+-+-+-+-+-+-+-+-+-+-+-+-+
|                   Max LSP Bandwidth at priority 1             |
+-+-+-+-+-+-+-+-+-+-+-+-+-+-+-+-+-+-+-+-+-+-+-+-+-+-+-+-+-+-+-+-+
|                   Max LSP Bandwidth at priority 2             |
+-+-+-+-+-+-+-+-+-+-+-+-+-+-+-+-+-+-+-+-+-+-+-+-+-+-+-+-+-+-+-+-+
|                   Max LSP Bandwidth at priority 3             |
+-+-+-+-+-+-+-+-+-+-+-+-+-+-+-+-+-+-+-+-+-+-+-+-+-+-+-+-+-+-+-+-+
|                   Max LSP Bandwidth at priority 4             |
+-+-+-+-+-+-+-+-+-+-+-+-+-+-+-+-+-+-+-+-+-+-+-+-+-+-+-+-+-+-+-+-+
|                   Max LSP Bandwidth at priority 5             |
+-+-+-+-+-+-+-+-+-+-+-+-+-+-+-+-+-+-+-+-+-+-+-+-+-+-+-+-+-+-+-+-+
|                   Max LSP Bandwidth at priority 6             |
+-+-+-+-+-+-+-+-+-+-+-+-+-+-+-+-+-+-+-+-+-+-+-+-+-+-+-+-+-+-+-+-+
|                   Max LSP Bandwidth at priority 7             |
+-+-+-+-+-+-+-+-+-+-+-+-+-+-+-+-+-+-+-+-+-+-+-+-+-+-+-+-+-+-+-+-+
|                        Work direction of link                 |
+-+-+-+-+-+-+-+-+-+-+-+-+-+-+-+-+-+-+-+-+-+-+-+-+-+-+-+-+-+-+-+-+
               Identity of
| Signal Type | wavelength    | Reserved | Idle resource |K3|K2|K1|K0|
               switch group
+-+-+-+-+-+-+-+-+-+-+-+-+-+-+-+-+-+-+-+-+-+-+-+-+-+-+-+-+-+-+-+-+
               Identity of
| Signal Type | wavelength    | Reserved | Idle resource |K3|K2|K1|K0|
               switch group
+-+-+-+-+-+-+-+-+-+-+-+-+-+-+-+-+-+-+-+-+-+-+-+-+-+-+-+-+-+-+-+-+
|                                                               |
//                       .........                              //
|                                                               |
+-+-+-+-+-+-+-+-+-+-+-+-+-+-+-+-+-+-+-+-+-+-+-+-+-+-+-+-+-+-+-+-+
               Identity of
| Signal Type | wavelength    | Reserved | Idle resource |K3|K2|K1|K0|
               switch group
+-+-+-+-+-+-+-+-+-+-+-+-+-+-+-+-+-+-+-+-+-+-+-+-+-+-+-+-+-+-+-+-+
```

Or two sub-TLVs are defined, one is for explaining the work direction of a link, and the other is for explaining the wavelength constraint characteristic information of a transmission link;

the sub-TLV for the work direction of a link is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            TYPE               |           LENGTH              |
+-+-+-+-+-+-+-+-+-+-+-+-+-+-+-+-+-+-+-+-+-+-+-+-+-+-+-+-+-+-+-+-+
|                        Work direction of link                 |
+-+-+-+-+-+-+-+-+-+-+-+-+-+-+-+-+-+-+-+-+-+-+-+-+-+-+-+-+-+-+-+-+
```

The sub-TLV defined by the resource state information of a wavelength channel and cross constraint information of a wavelength channel is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            TYPE               |        LENGTH = n*4           |
+-+-+-+-+-+-+-+-+-+-+-+-+-+-+-+-+-+-+-+-+-+-+-+-+-+-+-+-+-+-+-+-+
               Identity of
| Signal Type | wavelength    | Reserved | Idle resource |K3|K2|K1|K0|
               switch group
+-+-+-+-+-+-+-+-+-+-+-+-+-+-+-+-+-+-+-+-+-+-+-+-+-+-+-+-+-+-+-+-+
               Identity of
| Signal Type | wavelength    | Reserved | Idle resource |K3|K2|K1|K0|
               switch group
+-+-+-+-+-+-+-+-+-+-+-+-+-+-+-+-+-+-+-+-+-+-+-+-+-+-+-+-+-+-+-+-+
|                                                               |
//                       .........                              //
|                                                               |
+-+-+-+-+-+-+-+-+-+-+-+-+-+-+-+-+-+-+-+-+-+-+-+-+-+-+-+-+-+-+-+-+
               Identity of
| Signal Type | wavelength    | Reserved | Idle resource |K3|K2|K1|K0|
               switch group
+-+-+-+-+-+-+-+-+-+-+-+-+-+-+-+-+-+-+-+-+-+-+-+-+-+-+-+-+-+-+-+-+
```

When initiating a call connection establishment request, a call initiating node may, according to the link state advertisement information in the network, or according to the link state advertisement information and the summary information, check whether each link and each wavelength of each path in the path tree which is calculated by using the SPF algorithm according to the available link bandwidth information, possess the wavelength switching capability of end-to-end service establishment point by point according to the link switching constraint information, the resource state information and cross constraint information of a wavelength channel, and select a qualified path, and provide the available wavelength of each link in the path to provide reliable routing assurance for the call connection control.

Certainly, the present invention also has many other embodiments. Those skilled in the art may make various relevant changes and transformations based on the present invention. All such changes and transformations made without departing from the spirit and principle of the present invention shall be within the protection scope of the present invention.

INDUSTRIAL APPLICABILITY

The present invention provides a method for realizing source routing in a blocking cross network. By diffusing the cross constraint characteristic information in the network, a call initiating node can check a path tree according to the cross constraint characteristic information in the network to get a qualified service path. The present invention has overcome the problem in the existing technology that only the available link bandwidth information is considered as a routing calculation condition, which leads to the selection of the service path and wavelength being tried again and again in the process of call connection establishment, thereby making the control too complicated. When a control connection request is initiated, a complete end-to-end path and a proposed wavelength of each link in the first node can be calculated according to the link state advertisement information, and multi-level service scheduling is supported.

The invention claimed is:

1. A method for realizing source routing in a blocking cross network, comprising: link state advertisement information diffused in a network carrying cross constraint characteristic information, and a call initiating node checking a path tree to get a service path according to the cross constraint characteristic information included in the link state advertisement information in the network;

wherein the cross constraint characteristic information including physical transmission link layer constraint information of a link in a node, which is called link switching constraint information, and constraint information of each wavelength channel in the link, which is called wavelength constraint characteristic information, wherein the link switching constraint information is represented by a work direction and link constraint characteristic information corresponding to the work direction; and the link constraint characteristic information is represented by whether there is service scheduling capability between the link and a link of a corresponding work direction in a system;

wherein the wavelength constraint characteristic information includes resource state information and cross constraint information of each wavelength channel, and specifically includes a type of a signal carried over each wavelength channel, an identity of a wavelength switching group to which a wavelength belongs, resource state, and a type of signal cascade multiplexing.

2. The method according to claim 1, wherein the method includes the following steps:

(A) in a blocking cross network, the link switching constraint information of each link in a node and all the wavelength constraint characteristic information of each link are written into each link state advertisement information;

(B) the link state advertisement information is diffused in the network;

(C) when a node initiates a call connection establishment request, a path tree is calculated according to available link bandwidth information; and (D) the node checks the path tree by using the link switching constraint information and the wavelength constraint characteristic information which are included in the link state advertisement information, and selects a qualified service path from the path tree.

3. The method according to claim 1, wherein the process of that the call initiating node checks the path tree to get the service path according to the cross constraint characteristic information in the network includes:

the node checks each path and each node in each path tree according to the cross constraint characteristic information of the link to determine whether each link and each wavelength of each path in the path tree possess wavelength switching capability of end-to-end service establishment, and selects a qualified service path from the path tree to acquire source routing information.

4. The method according to claim 2, wherein the process of that the call initiating node checks the path tree to get the service path according to the cross constraint characteristic information in the network includes:

the node checks each path and each node in each path tree according to the cross constraint characteristic information of the link to determine whether each link and each wavelength of each path in the path tree possess wavelength switching capability of end-to-end service establishment, and selects a qualified service path from the path tree to acquire source routing information.

5. A method for realizing source routing in a blocking cross network, comprising: link state advertisement information diffused in a network carrying constraint information of each wavelength channel in a link; physical transmission link layer constraint information of each link in a node being diffused in the network; wherein the physical transmission link layer constraint information of the link in a node being called link switching constraint information; the constraint information of each wavelength channel in the link being called wavelength constraint characteristic information; and the link switching constraint information and the wavelength constraint characteristic information being collectively called cross constraint characteristic information, wherein the method includes the following steps:

(a) in a blocking cross network, all the wavelength constraint characteristic information of each link in a node is written into the link state advertisement information;

(b) the link state advertisement information is diffused in the network; and the link switching constraint information is diffused in the network as summary information;

(c) when a node initiates a call connection establishment request, a path tree is calculated according to available link bandwidth information; and (d) the node checks the path tree by using the link switching constraint information and the wavelength constraint characteristic information to get a qualified service path, wherein the summary information is represented by link constraint characteristic information corresponding to each work direction; and the link constraint characteristic information is represented by whether there is service scheduling capability between the link and a link of a corresponding work direction in a system;

wherein the wavelength constraint characteristic information includes resource state information and cross constraint information of each wavelength channel, and specifically includes a type of a signal carried over each wavelength channel, an identity of a wavelength switching group to which a wavelength belongs, resource state, and a type of signal cascade multiplexing.

6. The method according to claim 5, wherein the process of that the call initiating node checks the path tree to get the service path according to the cross constraint characteristic information in the network includes:

the node checks each path and each node in each path tree according to the cross constraint characteristic information of the link to determine whether each link and each wavelength of each path in the path tree possess wavelength switching capability of end-to-end service establishment, and selects a qualified service path from the path tree to acquire source routing information.

\* \* \* \* \*